US012278067B2

(12) United States Patent
Mori et al.

(10) Patent No.: US 12,278,067 B2
(45) Date of Patent: Apr. 15, 2025

(54) VACUUM INTERRUPTER

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Yoshinori Mori, Kawasaki Kanagawa (JP); Takeshi Yoshida, Fuchu Tokyo (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 195 days.

(21) Appl. No.: 18/066,884

(22) Filed: Dec. 15, 2022

(65) Prior Publication Data

US 2023/0197379 A1 Jun. 22, 2023

(30) Foreign Application Priority Data

Dec. 17, 2021 (JP) ................................ 2021-205267

(51) Int. Cl.
*H01H 1/02* (2006.01)
*H01H 33/662* (2006.01)
*H01H 33/666* (2006.01)

(52) U.S. Cl.
CPC ........ *H01H 33/666* (2013.01); *H01H 1/0203* (2013.01); *H01H 33/662* (2013.01)

(58) Field of Classification Search
CPC ............... H01H 33/666; H01H 33/662; H01H 33/6646; H01H 33/6642; H01H 33/6643;
(Continued)

(56) References Cited

U.S. PATENT DOCUMENTS 3,670,129 A * 6/1972 Cherry ............... H01H 33/6646 200/266
3,777,089 A * 12/1973 Nitz ................. H01H 33/66261 200/305

(Continued)

FOREIGN PATENT DOCUMENTS

DE 3533890 * 4/1987 ........... H01H 33/664
JP S54-65377 A 5/1979

(Continued)

OTHER PUBLICATIONS

Translation of DE3533890 (Original document published Apr. 2, 1987) (Year: 1987).*

*Primary Examiner* — William A Bolton
(74) *Attorney, Agent, or Firm* — Finnegan, Henderson, Farabow, Garrett & Dunner, LLP

(57) ABSTRACT

According to one embodiment, a Vacuum interrupter includes a pair of electrodes provided such that their electrode opposed surfaces face each other, and an undulating structure provided in at least one of the electrode opposed surfaces. The undulating structure includes one or more projections which project from the electrode opposed surface, and depressions provided so as to be adjacent to the projections, respectively. The projections and the depressions are alternately provided in a direction crossing the electrode opposed surface. In a conducting state in which the electrodes are in contact with each other, the projections are in contact with the opposite electrode opposed surface.

18 Claims, 8 Drawing Sheets

(58) Field of Classification Search
CPC . H01H 1/0203; H01H 1/06; H01H 2033/6648
USPC .......................... 218/118, 123, 127, 128, 146
See application file for complete search history.

(56) References Cited

U.S. PATENT DOCUMENTS

| | | | | | |
|---|---|---|---|---|---|
| 3,828,428 | A | * | 8/1974 | Wayland | H01H 1/0203 200/264 |
| 4,063,991 | A | * | 12/1977 | Farrall | H01H 33/66207 218/139 |
| 4,408,107 | A | * | 10/1983 | Sakuma | H01H 33/66207 218/139 |
| 4,760,223 | A | * | 7/1988 | Suzuki | H01H 33/6644 218/123 |
| 6,024,896 | A | | 2/2000 | Okutomi et al. | |
| 2006/0081560 | A1 | * | 4/2006 | Kikuchi | H01H 1/0203 218/123 |
| 2012/0241413 | A1 | * | 9/2012 | Li | H01H 33/6646 218/118 |

FOREIGN PATENT DOCUMENTS

| | | | |
|---|---|---|---|
| JP | H10-40761 | A | 2/1998 |
| JP | H10-245652 | A | 9/1998 |
| JP | 2009-289652 | A | 12/2009 |
| JP | 2010-163642 | A | 7/2010 |
| JP | 2020-27782 | A | 2/2020 |
| JP | 2020-149780 | A | 9/2020 |

* cited by examiner

VACUUM INTERRUPTER

CROSS-REFERENCE TO RELATED APPLICATIONS

This application is based upon and claims the benefit of priority from Japanese Patent Application No. 2021-205267, filed Dec. 17, 2021, the entire contents of which are incorporated herein by reference.

FIELD

Embodiments described herein relate generally to a Vacuum interrupter.

BACKGROUND

As a switching device provided in buildings or large facilities for power reception and distribution, for example, a switchgear comprising switching elements such as a circuit breaker and a disconnecting switch is known. To the switchgear, a Vacuum interrupter is applied as a structural element of the switching elements. The inside of the Vacuum interrupter is maintained in a certain insulating state by an insulating casing. In the insulating casing, a pair of electrodes is accommodated in such a way that they can be separated from and connected to each other. In this case, fault current is shut off or load current is switched by separating and connecting the electrodes. In this way, electric power is stably supplied from the switchgear.

Vacuum interrupters are required to attain both a low surge resistance and contact resistance characteristics. In a low surge resistance, the generation of abnormal voltage is prevented when the contacts (specifically, the fixed contact and the movable contact) of the electrodes are formed of a material consisting primarily of silver (Ag) and tungsten carbide (WC). Further, in contact resistance characteristics, when the electrode opposed surfaces of the contacts of the electrodes consist of smooth surfaces which are soft (flexible) without a depression or projection, the contact area of the electrode opposed surfaces is increased.

However, if these electrodes (the fixed contact and the movable contact) are repeatedly separated and connected, adhesive wear may be caused in the electrode opposed surfaces by slight slipping when the electrode opposed surfaces contact each other. In this case, irregular projections and depressions may be locally formed depending on the degree of the adhesive wear, and the contact area of the electrode opposed surfaces may be significantly decreased. As a result, the contact resistance value may be rapidly increased.

DETAILED DESCRIPTION

Figure 1:
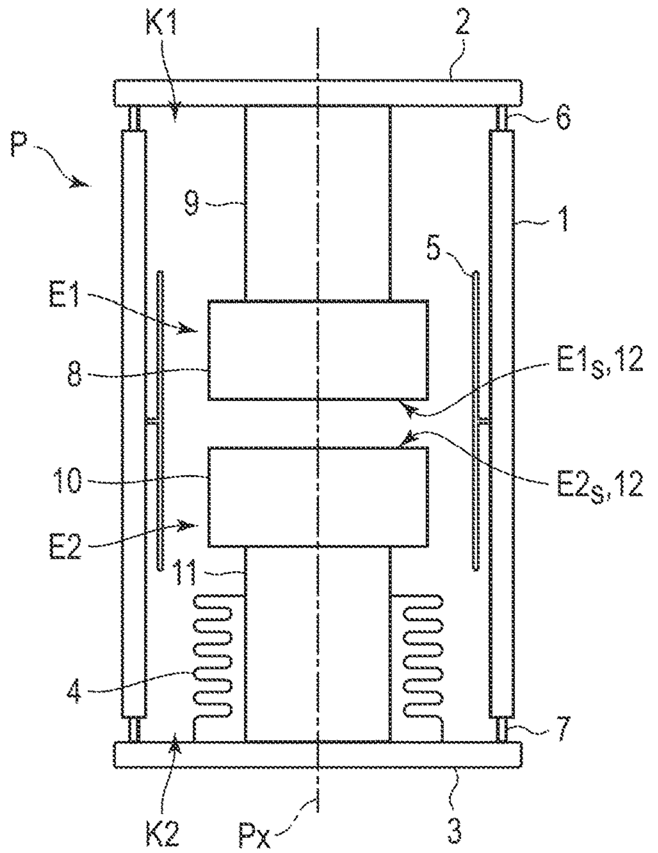
FIG. 1 is a diagram showing an internal structure of a Vacuum interrupter according to a first embodiment.

Various embodiments will be described hereinafter with reference to the accompanying drawings.

In general, according to one embodiment, a Vacuum interrupter comprises a pair of electrodes provided such that their electrode opposed surfaces face each other and allowed to be separated from and connected to each other, and an undulating structure provided in each of the electrode opposed surfaces or in one of the electrode opposed surfaces. The undulating structure comprises one or more projections which project from the electrode opposed surface such that the electrode opposed surface has a regular concavo-convex shape extending in a predetermined direction, and depressions provided so as to be adjacent to the projections, respectively. The projections and the depressions are alternately provided in a direction crossing the electrode opposed surface. In a conducting state in which the electrodes are in contact with each other, the projections are in contact with the opposite electrode opposed surface.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

FIG. 1 is an internal structural diagram of a Vacuum interrupter P according to a first embodiment. The Vacuum interrupter P comprises a fixed electrode E1, a movable electrode E2, an insulating casing (vacuum casing) 1, a fixed side sealing member 2, a movable side sealing member 3, an airtight maintenance mechanism 4 and an arc shield 5. The fixed electrode E1, the movable electrode E2, the airtight maintenance mechanism 4 and the arc shield 5 are accommodated in the insulating casing 1.

In the example of FIG. 1, the insulating casing 1 is formed into, for example, a hollow cylindrical shape by an insulating material such as alumina ceramic. The fixed side sealing member 2 and the movable side sealing member 3 are formed of, for example, a metal material consisting primarily of stainless steel.

As shown in FIG. 1, the insulating casing 1 having a hollow cylindrical shape forms a concentric shape based on a virtual axis Px which defines the center of the Vacuum interrupter P. The both ends of the insulating casing 1 are open when the insulating casing 1 is viewed in a virtual axial (Px) direction. Both of the openings (a fixed side opening K1 and a movable side opening K2) are covered with the fixed side sealing member 2 and the movable side sealing member 3. Specifically, the fixed side sealing member 2 seals the fixed side opening K1, which is one of the openings of the insulating casing 1, via fixed side sealing metal fittings 6. The movable side sealing member 3 seals the movable side opening K2, which is the other opening of the insulating casing 1, via movable side sealing metal fittings 7.

The arc shield 5 is formed of, for example, a metal material consisting primarily of copper or stainless steel. The arc shield 5 forms a hollow cylindrical shape and is fixed to the insulating casing 1. The arc shield 5 is provided so as to accommodate the fixed contact 8 of the fixed electrode E1 and the movable contact 10 of the movable electrode E2. As a method of fixing the arc shield 5, other than the insulating casing 1, for example, the arc shield 5 may be fixed to the fixed side sealing member 2 or the movable side sealing member 3.

The fixed electrode E1 and the movable electrode E2 are structured concentrically based on the virtual axis Px. The fixed electrode E1 and the movable electrode E2 align and extend along the virtual axis Px. In this state, the fixed electrode E1 and the movable electrode E2 are located such that their electrode opposed surfaces (a fixed side electrode opposed surface E1*s* and a movable side electrode opposed surface E2*s*) parallelly face each other.

The fixed electrode E1 comprises the fixed contact 8 and a fixed side current-carrying shaft 9. The movable electrode E2 comprises the movable contact 10 and a movable side current-carrying shaft 11. One of the electrode opposed surfaces described above (in other words, the electrode opposed surface E1*s*) is provided in the fixed contact 8. The other electrode opposed surface E2*s* is provided in the movable contact 10. The fixed side current-carrying shaft 9 and the movable side current-carrying shaft 11 form columnar shapes having the same diameter and are formed of a material having a high conductivity (for example, Cu).

The fixed contact 8 and the movable contact 10 are provided to face each other such that their electrode opposed surfaces E1*s* and E2*s* parallelly face each other. The fixed contact 8 is connected to an end of the fixed side current-carrying shaft 9. The other end of the fixed side current-carrying shaft 9 is fixed to the Vacuum interrupter P along the virtual axis Px via the fixed side sealing member 2 such that the other end cannot be moved. The movable contact 10 is connected to an end of the movable side current-carrying shaft 11. The other end of the movable side current-carrying shaft 11 is coupled to an operation mechanism (not shown) via the movable side sealing member 3. The structures and materials of the fixed contact 8 and the movable contact 10 are described in detail later in the explanations of FIG. 2 and FIG. 3.

As shown in FIG. 1, the movable side current-carrying shaft 11 is moved along the virtual axis Px by the operation mechanism. By this structure, the movable contact 10 can be separated and connected with respect to the fixed contact 8. Specifically, their electrode opposed surfaces E1*s* and E2*s* can be separated from and connected to each other. As a result, the Vacuum interrupter P can be opened and closed (in other words, the pair of electrodes E1 and E2 can be separated from and connected to each other).

Further, the airtight maintenance mechanism 4 is provided between the movable side current-carrying shaft 11 and the movable side sealing member 3. The airtight maintenance mechanism 4 consists of a stretchy bellows. The bellows (airtight maintenance mechanism) 4 is formed of, for example, a thin metal material such as a stainless material. The bellows 4 forms a bellows shape which is stretchable in a virtual axial (Px) direction, and covers the outside of the movable side current-carrying shaft 11 without any space.

An end of the bellows 4 is attached to the movable side sealing member 3 without any space. The other end is attached to the movable side current-carrying shaft 11 without any space. By this structure, the inside of the insulating casing 1 is maintained in an airtight state (vacuum state) at any time. As a result, when the Vacuum interrupter P is opened or closed, air does not enter the insulating casing 1 even while the movable side current-carrying shaft 11 is moved along the virtual axis Px.

Figure 2:
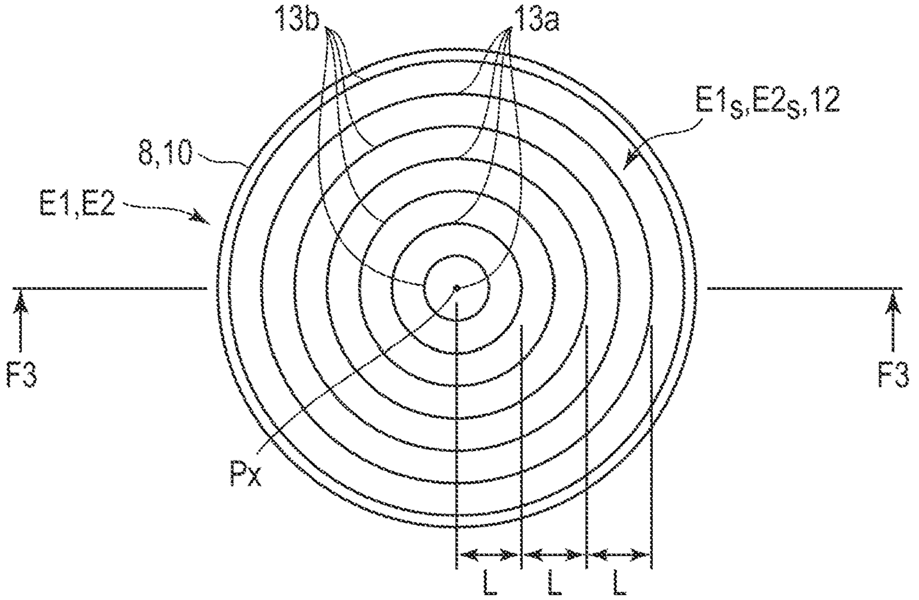
FIG. 2 is a plan view showing the structure of the opposed surfaces of the electrodes (contacts) of FIG. 1.
Figure 3:
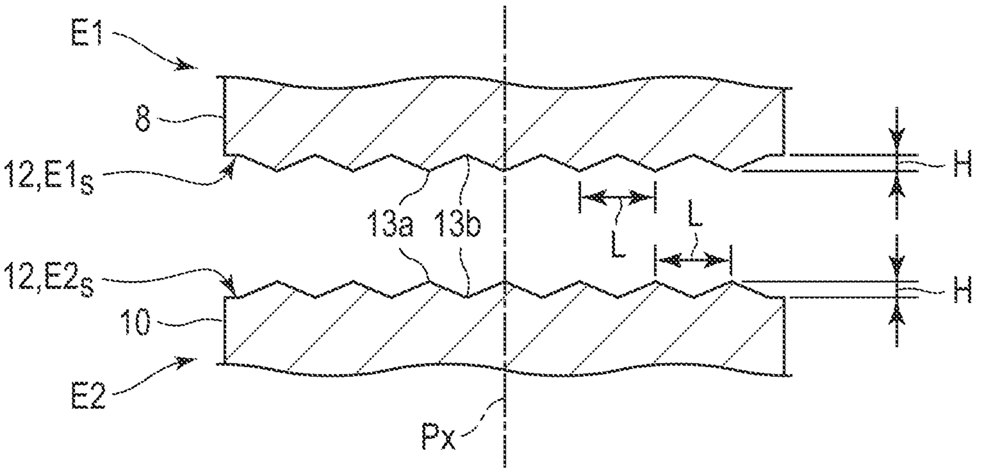
FIG. 3 is a cross-sectional view along the F3-F3 line of FIG. 2.

FIG. 2 is a planar structural diagram of undulating structures 12. FIG. 3 is a cross-sectional structural diagram of the undulating structures 12.

The Vacuum interrupter P of the present embodiment comprises the undulating structures 12 in addition to the above structural elements. The undulating structures 12 allow the electrode opposed surfaces E1*s* and R2*s* of the contacts 8 and 10 described above to have a regular concavo-convex shape extending in a predetermined direction. The undulating structure 12 is provided in each of the electrode opposed surfaces E1*s* and E2*s* or in only the electrode opposed surface E1*s* (or E2*s*).

The fixed contact 8 and the movable contact 10 are formed of a material consisting primarily of silver (Ag) and tungsten carbide (WC) and containing an auxiliary ingredient depending on the need. Here, to the auxiliary ingredient, for example, at least one of Co, Cu and Ni is applied, and the total amount of the auxiliary ingredient is less than or equal to 5 percent by mass. In this case, when the auxiliary ingredient is contained, the workability is improved. However, when the amount exceeds 5 percent by mass, the lathe machining properties are decreased. Thus, the total amount of the auxiliary ingredient should be desirably less than or equal to 1 percent by mass.

In the example of FIG. 2 and FIG. 3, the electrode opposed surfaces E1*s* and E2*s* are structured as circular flat surfaces (planes without a depression or projection) based on the virtual axis Px described above in a state before the undulating structure 12 is applied. The undulating structure 12 is provided over the entire part of each of the flat electrode opposed surfaces E1*s* and E2*s*. The undulating structures 12 provided in both of the electrode opposed surfaces E1*s* and E2*s* have the same structure.

As shown in FIG. 2 and FIG. 3, each undulating structure 12 comprises a plurality of projections 13*a* and a plurality of depressions 13*b*.

The projections 13*a* are configured to project from the electrode opposed surfaces E1*s* and E2*s*. Each projection 13*a* has an outline which projects in a triangular shape in a cross-sectional view of a direction crossing the electrode opposed surfaces E1*s* and E2*s* (for example, a radial direction from the virtual axis Px).

Each projection 13*a* extends in an annular shape so as to be continuous in a circumferential direction based on the virtual axis Px. The projections 13*a* form annular shapes having different sizes (diameters). These projections 13*a* are concentrically provided based the virtual axis Px. The projections 13*a* are provided at regular intervals when they are viewed in a direction crossing the electrode opposed surfaces E1*s* and E2*s* (for example, a radial direction from the virtual axis Px).

The depressions 13*b* are formed by causing the electrode opposed surfaces E1*s* and E2*s* to cave in. Each depression 13*b* has an outline which is depressed in a triangular shape in a cross-sectional view of a direction crossing the electrode opposed surfaces E1*s* and E2*s* (for example, a radial direction from the virtual axis Px).

Each depression 13*b* extends in an annular shape so as to be continuous in a circumferential direction based on the virtual axis Px. The depressions 13*b* form annular shapes having different sizes (diameters). These depressions 13*b* are concentrically provided based the virtual axis Px. The depressions 13*b* are provided at regular intervals when they are viewed in a direction crossing the electrode opposed surfaces E1*s* and E2*s* (for example, a radial direction from the virtual axis Px).

In the structure described above, the projections 13*a* and the depressions 13*b* are located such that each projection 13*a* is interposed between two depressions 13*b*. In other words, a projection 13*a* is provided so as to be adjacent to a depression 13*b*. In other words, the projections 13*a* are alternately provided with the depressions 13*b* when they are viewed in a direction crossing the electrode opposed surfaces E1*s* and E2*s* (for example, a radial direction from the virtual axis Px).

In the undulating structures 12 described above, the electrode opposed surfaces E1*s* and E2*s* have a regular concavo-convex shape in which the projections 13*a* alternate with the depressions 13*b* in a radial direction from the virtual axis Px while the annular projections 13*a* and depressions 13*b* continuously extend in a predetermined direction (in other words, in a circumferential direction based on the virtual axis Px).

As a method of applying the above undulating structure 12 having a regular concavo-convex shape to the electrode opposed surfaces E1*s* and E2*s*, for example, a machining method of using an existing lathe to apply the undulating structure 12 to the electrode opposed surfaces E1*s* and E2*s* can be employed. In the lathe machining, first, the contacts 8 and 10 in which the electrode opposed surfaces E1*s* and E2*s* are flat are prepared. To maintain the low surge resistance of the Vacuum interrupter P, the contacts 8 and 10 are formed of a material consisting primarily of Ag and WC and containing the auxiliary ingredient described above depending on the need.

Subsequently, the electrode opposed surfaces E1*s* and E2*s* are shaved in an annular shape by pressing a knife (tool) onto the electrode opposed surfaces E1*s* and E2*s* in a state where the contacts 8 and 10 rotate based on the virtual axis Px as the rotation center. At this time, the shaved portions are the above depressions 13*b* having a triangular cross-sectional surface. The remaining portions which are not shaved are the above projections 13*a* having a triangular cross-sectional surface.

In this case, to realize the Vacuum interrupter P which is excellent in the low surge resistance described above, the contact resistance characteristics which require the softness (flexibility) of the electrode opposed surfaces E1*s* and E2*s*, and the adhesive wear resistance which requires the rigidity of the electrode opposed surfaces E1*s* and E2*s*, the surface state (in other words, surface roughness) of the electrode opposed surfaces E1*s* and E2*s* needs to be rigid and soft, and a regular concavo-convex shape.

To meet this need, the height of each projection 13*a* defined by the difference in height between each projection 13*a* and each depression 13*b* should satisfy the conditions described below. The difference in height between each projection 13*a* and each depression 13*b* is defined as the linear distance (length) between the taper tip of each triangular projection 13*a* and the taper tip of each triangular depression 13*b* when they are viewed in a direction parallel to the virtual axis Px.

At this time, as the accuracy of the above lathe machining, for example, when the pitch width between two adjacent projections 13*a* is L, and the height of each projection 13*a* defined by the difference in height between each projection 13*a* and each depression 13*b* is H, pitch width L should be desirably greater than height H. In other words, the relationship of $L>H$ should be desirably satisfied. More desirably, pitch width L should be greater than or equal to five times height H. In other words, the relationship of $L>5H$ should be satisfied. In this case, in consideration of the upper limit of pitch width L, the relationship of $10H>L>5H$ should be desirably satisfied.

Figure 4:
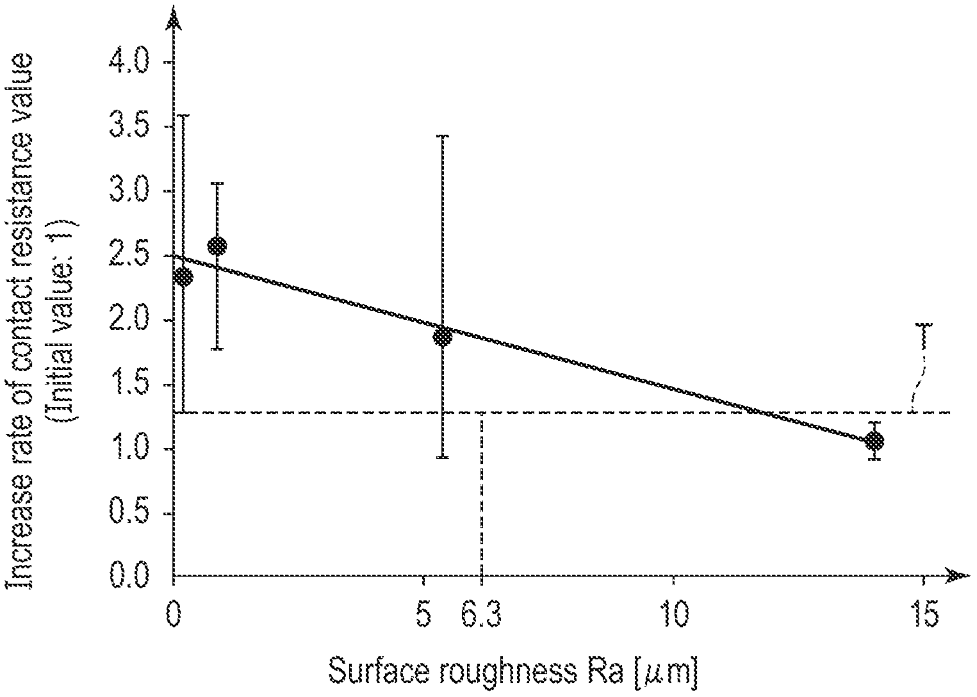
FIG. 4 is a diagram showing the relationship between the contact resistance value and the surface roughness of the opposed surfaces.

FIG. 4 is a correlation diagram of the surface roughness Ra of the electrode opposed surfaces E1*s* and E2*s* and the increase rate of contact resistance value. In the example of FIG. 4, four measurement values which differ in the surface roughness Ra (shown by black circles in the figure) are plotted. The error range (error bar showing the greatest value and the least value) of each measurement value is added. Each measurement value is the mean value of the contact resistance values of the electrode opposed surfaces E1*s* and E2*s* obtained by opening and closing nine sample Vacuum interrupter such that the electrode opposed surfaces E1*s* and E2*s* are separated from and connected to each other several times.

As shown in FIG. 4, the surface roughness Ra in which the above mean value (measurement value) is less than neighborhood T of the initial value "1" of the contact resistance value satisfies the relationship of $5\ \mu m<Ra<25\ \mu m$ in consideration of the error ranges (error bars). According to the surface roughness Ra having this relationship, even if the contacts 8 and 10 are repeatedly separated from and connected to each other for long periods, the variation of the contact resistance value can be kept within the tolerance.

In the range of $0\ \mu m \leq Ra \leq 5\ \mu m$, the contact resistance value obtained by separating and connecting the electrode opposed surfaces E1*s* and E2*s* several times exceeds neighborhood T of the initial value "1". According to the surface roughness Ra having this relationship, if the contacts 8 and 10 are repeatedly separated from and connected to each other for long periods, the increase rate of the contact resistance value is increased. In other words, the contact resistance value is rapidly increased.

In this case, the undulating structure 12 should be desirably applied to the electrode opposed surfaces E1s and E2s such that they have a regular concavo-convex shape in which the surface roughness Ra satisfies the relationship of $5\ \mu m < Ra < 25\ \mu m$. More desirably, the surface roughness of the electrode opposed surfaces E1s and E2s should satisfy the relationship of $6.3\ \mu m\ Ra \leq 12\ \mu m$ in the arithmetic average roughness Ra of the surface roughness measured with an evaluation length of 5 mm. From a different point of view, the surface roughness of the electrode opposed surfaces E1s and E2s should desirably satisfy the relationship of $15\ \mu m \leq Rz \leq 40\ \mu m$ at the maximum height Rz of the surface roughness measured with an evaluation length of 5 mm.

In the surface roughness Ra which satisfies this relationship, for example, when the arithmetic average roughness of the surface roughness of the electrode opposed surfaces E1s and E2s defined by JIS B 0601 is Ra, the above height H of each projection 13a should desirably satisfy the relationship of $H \approx 4 \times Ra$. The multiple "4" in this relationship is based on an experimental rule and will be changed based on the future use.

For example, when the arithmetic average roughness Ra of the surface roughness of the electrode opposed surfaces E1s and E2s measured with an evaluation length of 5 mm is greater than or equal to 6.3 μm, and the number of provided projections 13a is N in a direction crossing the electrode opposed surfaces E1s and E2s, the mean value of heights H of N projections 13a is greater than or equal to 30 μm, and the relationship of $H \approx 4 \times Ra$ described above is satisfied.

According to the first embodiment described above, the undulating structure 12 having a regular concavo-convex shape in which the mean value of heights H of the projections 13a is greater than or equal to 30 μm is applied to the electrode opposed surfaces E1s and E2s. In this case, the projections 13a are regularly provided at regular intervals while having the above height H when they are viewed in a direction crossing the electrode opposed surfaces E1s and E2s. In this structure, when the Vacuum interrupter P is closed, in a conducting state in which the electrodes E1 and E2 are in contact with each other, the projections 13a are equally in contact with the opposite electrode opposed surface E1s or E2s. At this time, the contact state of the electrode opposed surfaces E1s and E2s is equivalent to the contact state of rigid and soft surfaces having a regular concavo-convex shape at all times. As a result, it is possible to realize the Vacuum interrupter P which is excellent in the adhesive wear resistance while maintaining both the low surge resistance and the contact resistance characteristics.

Second Embodiment

Figure 5:
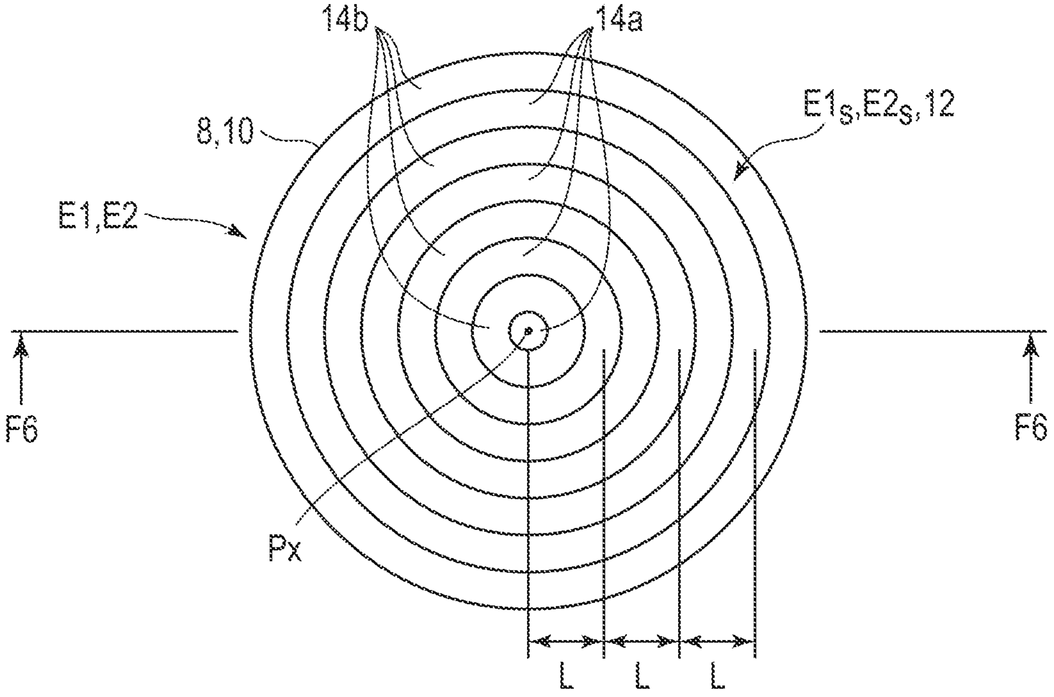
FIG. 5 is a plan view showing the structure of the opposed surfaces of electrodes (contacts) according to a second embodiment.
Figure 6:
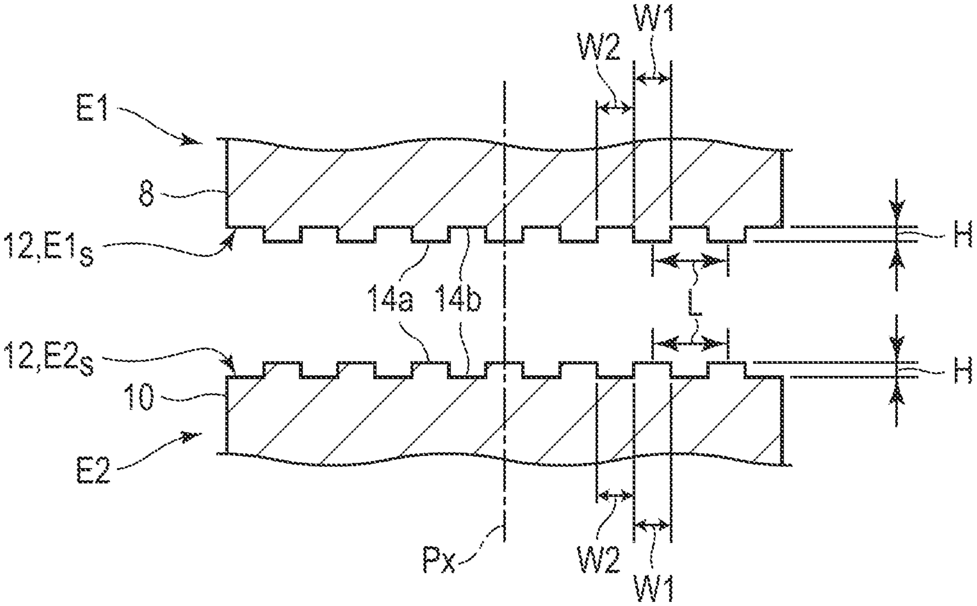
FIG. 6 is a cross-sectional view along the F6-F6 line of FIG. 5.

FIG. 5 is a planar structural diagram of the undulating structures 12 of a Vacuum interrupter P according to a second embodiment. FIG. 6 is a cross-sectional structural diagram of the undulating structures 12. The undulating structures 12 of the present embodiment comprise the same structure in both of electrode opposed surfaces E1s and E2s.

As shown in FIG. 5 and FIG. 6, each undulating structure 12 comprise a plurality of projections 14a and a plurality of depressions 14b.

The projections 14a have an outline which projects from the electrode opposed surfaces E1s and E2s in a rectangular shape and are concentrically provided. The projections 14a are provided at regular intervals when they are viewed in a direction crossing the electrode opposed surface E1s and E2s (for example, a radial direction from a virtual axis Px).

The depressions 14b have an outline formed by causing the electrode opposed surfaces E1s and E2s to cave in in a rectangular shape and are concentrically provided. The depressions 14b are provided at regular intervals when they are viewed in a direction crossing the electrode opposed surfaces E1s and E2s (for example, a radial direction from the virtual axis Px).

In this structure, the electrode opposed surfaces E1s and E2s have a regular concavo-convex shape in which the projections 14a alternate with the depressions 14b in a radial direction from the virtual axis Px while the annular projections 14a and depressions 14b continuously extend in a predetermined direction (in other words, in a circumferential direction based on the virtual axis Px).

As a method of applying the above undulating structure 12 having a regular concavo-convex shape to the electrode opposed surfaces E1s and E2s, for example, first, in a manner similar to that of the first embodiment described above, the electrode opposed surfaces E1s and E2s are shaved to form the projections 14a and the depressions 14b having a triangular cross-sectional surface by an existing lathe. Subsequently, the portions which project in a triangular shape are flattened. By this process, the undulating structure 12 having a concavo-convex shape in which the cross-sectional surface is rectangular, square or trapezoidal is applied to the electrode opposed surfaces E1s and E2s.

In this case, when the width of each projection 14a is W1 and the width of each depression 14b is W2 in a direction crossing the electrode opposed surfaces E1s and E2s (for example, a radial direction from the virtual axis Px), the relationship of $W1 \geq W2$ is satisfied. For example, FIG. 6 shows the undulating structures 12 which have a concavo-convex shape satisfying the relationship of $W1 = W2$.

According to the second embodiment described above, when the Vacuum interrupter P is closed, in a conducting state in which the electrodes E1 and E2 are in contact with each other, the rectangular projections 14a are equally in contact with the opposite electrode opposed surface E1s or E2s in a planar manner. In this structure, the contact state of the electrode opposed surfaces E1s and E2s is equivalent to the contact state of rigid and soft surfaces having a regular concavo-convex shape at all times while improving the maintenance of the easiness of the flowing of current.

As a result, the electric flow property can be improved. The other structures and effects are the same as the first embodiment described above, explanation thereof being omitted.

Third Embodiment

Figure 7:
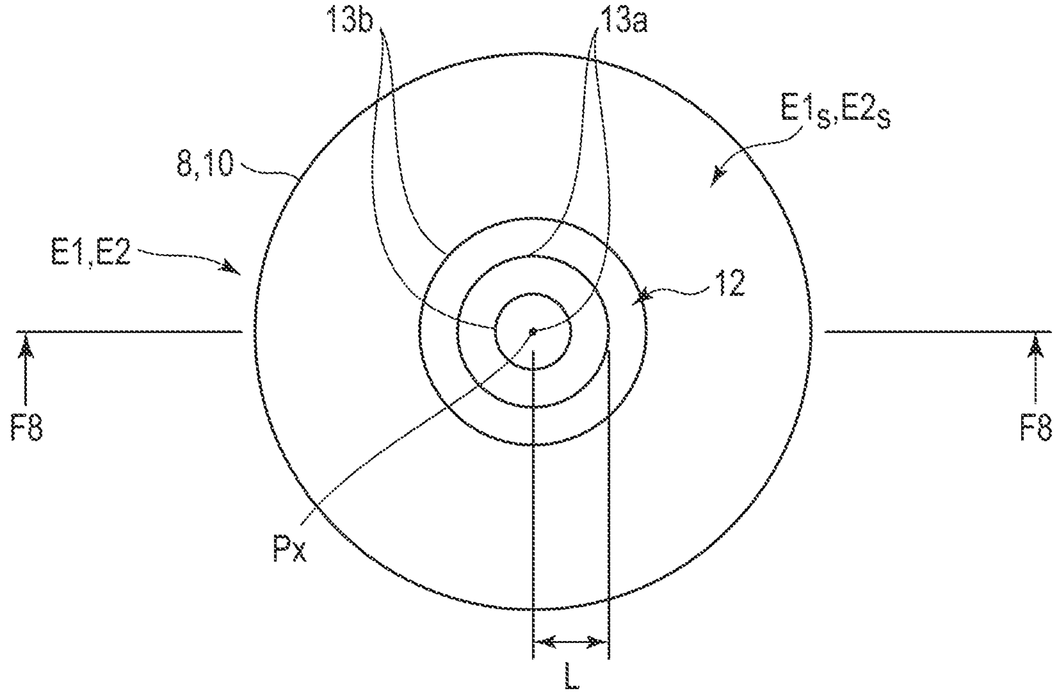
FIG. 7 is a plan view showing the structure of the opposed surfaces of electrodes (contacts) according a third embodiment.
Figure 8:
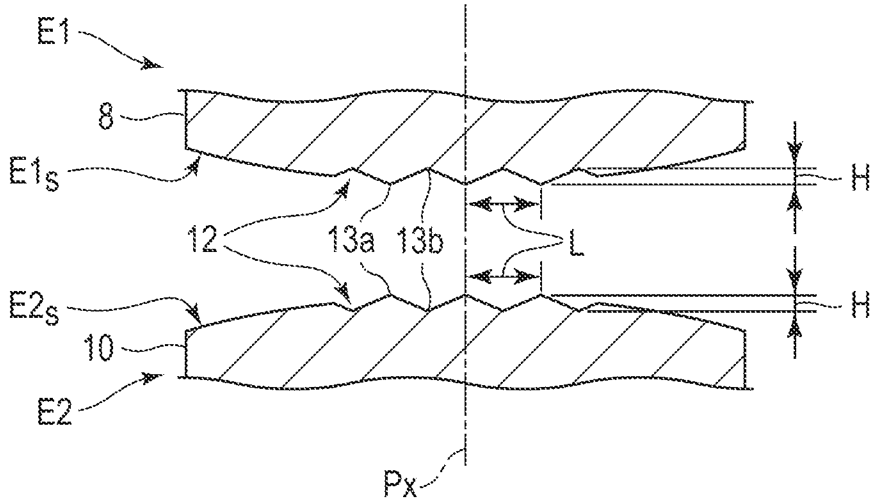
FIG. 8 is a cross-sectional view along the F8-F8 line of FIG. 7.

FIG. 7 is a planar structural diagram of the undulating structures 12 of a Vacuum interrupter P according to a third embodiment. FIG. 8 is a cross-sectional structural diagram of the undulating structures 12. The undulating structures 12 of the present embodiment comprise the same structure in both of electrode opposed surfaces E1s and E2s.

As shown in FIG. 7 and FIG. 8, the undulating structure 12 is provided in part of each of the electrode opposed surfaces E1s and E2s, and has the same outline as the first embodiment described above. In other words, a plurality of projections 13a which project from the electrode opposed surfaces E1s and E2s in a triangular shape and a plurality of depressions 13b which are depressed in a triangular shape are concentrically provided at regular intervals such that the projections 13*a* alternate with the depressions 13*b*.

For example, in FIG. 7 and FIG. 8, the electrode opposed surfaces E1*s* and E2*s* have a surficial outline which is curved like an arc along the virtual axis Px described above. The undulating structures 12 are concentrically provided around the vicinity of the virtual axis Px.

According to the third embodiment described above, the undulating structures 12 can be formed by merely applying lathe machining to only part of the electrode opposed surfaces E1*s* and E2*s*. This structure can reduce the processing time and minimize the effect on the other performance. The other structures and effects and the method of applying the undulating structures 12 are the same as the first embodiment described above, explanation thereof being omitted.

First Modification Example

Figure 9:
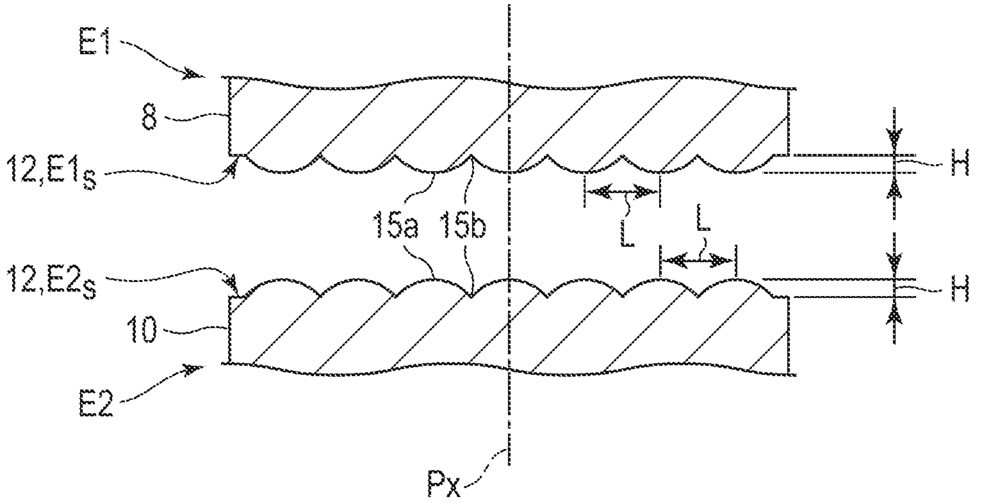
FIG. 9 is a cross-sectional view showing the structure of the opposed surfaces of the electrodes (contacts) according to a first modification example.

FIG. 9 is a cross-sectional structural diagram of the undulating structures 12 of the Vacuum interrupter P according to a first modification example. The undulating structures 12 of this example comprise the same structure in both of electrode opposed surfaces E1*s* and E2*s*.

As shown in FIG. 9, each undulating structure 12 comprises a plurality of projections 15*a* which project in an arcuate shape from the electrode opposed surface E1*s* or E2*s*, and a plurality of depressions 15*b* each of which is formed between two adjacent projections 15*a*. Each undulating structure 12 has a regular concavo-convex shape in which the projections 15*a* alternate with the depressions 15*b* in a radial direction from the virtual axis Px.

According to the first modification example described above, in a manner similar to that of the above first embodiment, the contact state of the electrode opposed surfaces E1*s* and E2*s* is equivalent to the contact state of rigid and soft surfaces having a regular concavo-convex shape at all times when the Vacuum interrupter P is closed. The other structures and effects are the same as the first embodiment described above, explanation thereof being omitted.

Second Modification Example

Figure 10:
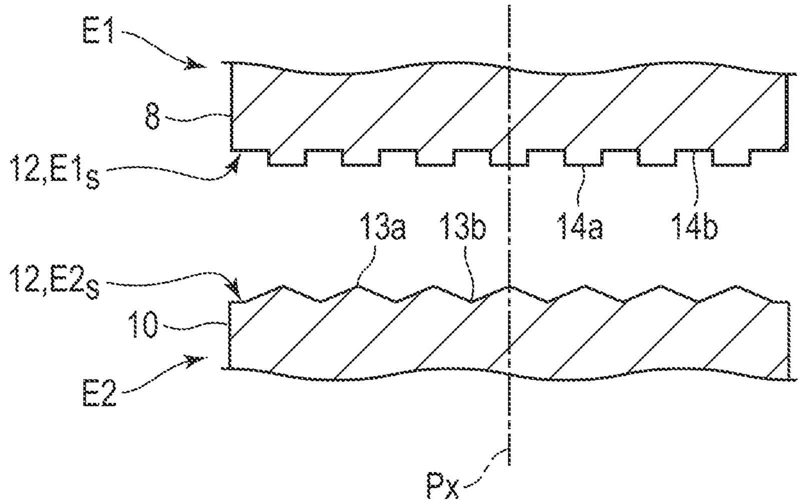
FIG. 10 is a cross-sectional view showing the structure of the opposed surfaces of the electrodes (contacts) according to a second modification example.

FIG. 10 is a cross-sectional structural diagram of the undulating structures 12 of the Vacuum interrupter P according to a second modification example. The undulating structures 12 of this example comprise different structures in the electrode opposed surfaces E1*s* and E2*s*.

For example, in FIG. 10, the electrode opposed surface E1*s* of the fixed electrode E1 has a regular concavo-convex shape in which the rectangular projections 14*a* alternate with the rectangular depressions 14*b* in a radial direction from the virtual axis Px. The electrode opposed surface E2*s* of the movable electrode E2 has a regular concavo-convex shape in which the triangular projections 13*a* alternate with the triangular depressions 13*b* in a radial direction from the virtual axis Px.

According to the second modification example described above, in a manner similar to that of the above first embodiment, the contact state of the electrode opposed surfaces E1*s* and E2*s* is equivalent to the contact state of rigid and soft surfaces having a regular concavo-convex shape at all times when the Vacuum interrupter P is closed. The other structures and effects are the same as the first embodiment described above, explanation thereof being omitted.

Third Modification Example

Figure 11:
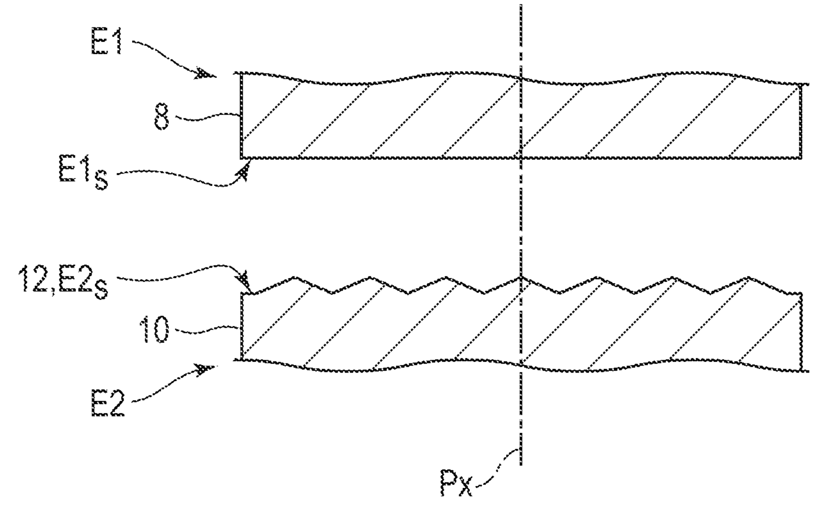
FIG. 11 is a cross-sectional view showing the structure of the opposed surfaces of the electrodes (contacts) according to a third modification example.

FIG. 11 is a cross-sectional structural diagram of the undulating structure 12 of the Vacuum interrupter P according to a third modification example. The undulating structure 12 of this example is provided in only one of the electrode opposed surfaces E1*s* and E2*s*. For example, in FIG. 11, the electrode opposed surface E2*s* of the movable electrode E2 has a regular concavo-convex shape in which the triangular projections 13*a* alternate with the triangular depressions 13*b* in a radial direction from the virtual axis Px. The electrode opposed surface E1*s* of the fixed electrode E1 is structured as a circular flat surface (a plane without a depression or projection) based on the virtual axis Px described above in a state before the undulating structure 12 is applied.

According to the third modification example described above, in a manner similar to that of the above first embodiment, the contact state of the electrode opposed surfaces E1*s* and E2*s* is equivalent to a rigid and soft contact state at all times when the Vacuum interrupter P is closed. The other structures and effects are the same as the first embodiment described above, explanation thereof being omitted.

Fourth Modification Example

Figure 12:
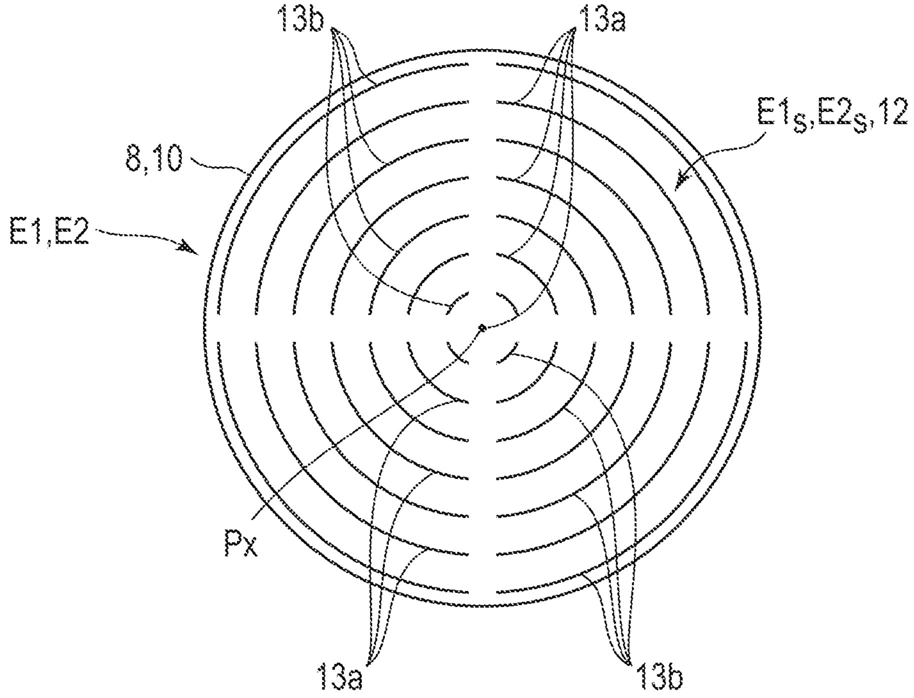
FIG. 12 is a plan view showing the structure of the opposed surfaces of the electrodes (contacts) according to a fourth modification example.

FIG. 12 is a planar structural diagram of the undulating structures 12 of the Vacuum interrupter P according to a fourth modification example. The undulating structures 12 of this example have a regular concavo-convex shape in which the projections 13*a* alternate with the depressions 13*b* in a radial direction from the virtual axis Px while the annular projections 13*a* and depressions 13*b* intermittently extend in a predetermined direction (in other words, in a circumferential direction based on the virtual axis Px) in the electrode opposed surfaces E1*s* and E2*s*.

For example, in FIG. 12, in a manner similar to that of the above first embodiment, in each of the electrode opposed surfaces E1*s* and E2*s*, a plurality of projections 13*a* which have an outline projecting in a triangular shape and a plurality of depressions 13*b* which have an outline depressed in a triangular shape are provided.

The projections 13*a* and the depressions 13*b* are divided into quarters at regular intervals in a circumferential direction. In this case, the projections 13*a* and the depressions 13*b* may be caused to be intermittent by dividing them into, for example, two, three or five equal parts.

According to the fourth modification example described above, in a manner similar to that of the above first embodiment, the contact state of the electrode opposed surfaces E1*s* and E2*s* is equivalent to a rigid and soft contact state at all times when the Vacuum interrupter P is closed. The other structures and effects are the same as the first embodiment described above, explanation thereof being omitted.

Fifth Modification Example

Figure 13:
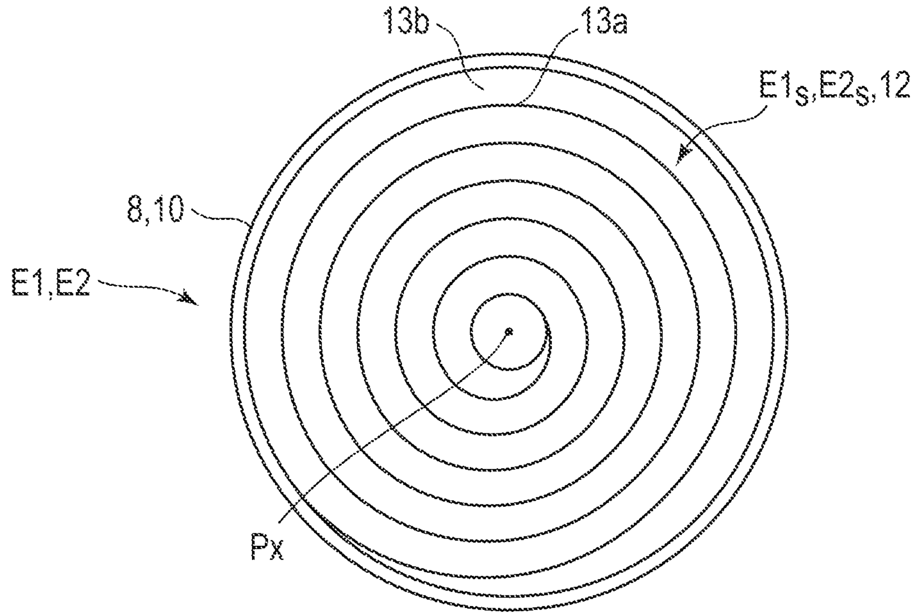
FIG. 13 is a plan view showing the structure of the opposed surfaces of the electrodes (contacts) according to a fifth modification example.

FIG. 13 is a planar structural diagram of the undulating structures 12 of the Vacuum interrupter P according to a fifth modification example. In each of the electrode opposed surfaces E1*s* and E2*s* comprising the undulating structures 12 of this example, a single projection 13*a* helically and continuously extends. In this case, a depression 13*b* which is helically continuous is provided so as to be adjacent to the projection 13*a*.

For example, in FIG. 13, in a manner similar to that of the above first embodiment, in each of the electrode opposed surfaces E1*s* and E2*s*, a single projection 13*a* which has an outline projecting in a triangular shape and a single depression 13*b* which has an outline depressed in a triangular shape are provided.

In this structure, the projection 13*a* and the depression 13*b* are alternately provided when they are viewed in a direction crossing the electrode opposed surfaces E1*s* and E2*s* (for example, a radial direction from the virtual axis Px).

According to the fifth modification example described above, in a manner similar to that of the above first embodiment, the contact state of the electrode opposed surfaces E1*s* and E2*s* is equivalent to a rigid and soft contact state at all times when the Vacuum interrupter P is closed. The other structures and effects are the same as the first embodiment described above, explanation thereof being omitted.

Sixth Modification Example

Figure 14:
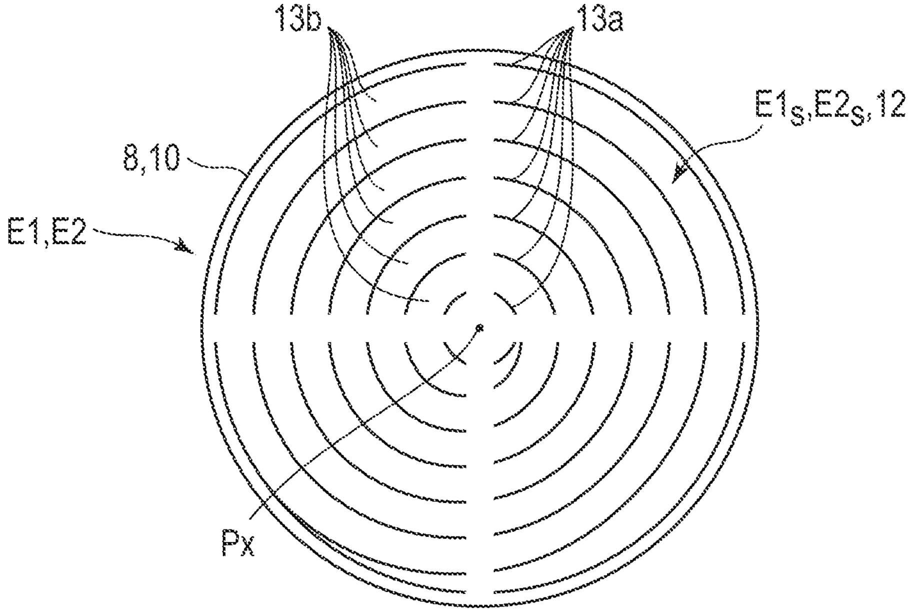
FIG. 14 is a plan view showing the structure of the opposed surfaces of the electrodes (contacts) according to a sixth modification example.

FIG. 14 is a planar structural diagram of the undulating structures 12 of the Vacuum interrupter P according to a sixth modification example. The undulating structures 12 of this example have a regular concavo-convex shape in which the projections 13*a* alternate with the depressions 13*b* in a radial direction from the virtual axis Px while the helical projection 13*a* and depression 13*b* shown in FIG. 13 intermittently extend in a predetermined direction (in other words, in a circumferential direction based on the virtual axis Px) in the electrode opposed surfaces E1*s* and E2*s*.

For example, in FIG. 14, in a manner similar to that of the above first embodiment, in each of the electrode opposed surfaces E1*s* and E2*s*, a plurality of projections 13*a* which have an outline projecting in a triangular shape and a plurality of depressions 13*b* which have an outline depressed in a triangular shape are provided.

The projections 13*a* and the depressions 13*b* are divided into quarters at regular intervals in a circumferential direction. In this case, the projections 13*a* and the depressions 13*b* may be caused to be intermittent by dividing them into, for example, two, three or five equal parts.

According to the sixth modification example described above, in a manner similar to that of the above first embodiment, the contact state of the electrode opposed surfaces E1*s* and E2*s* is equivalent to a rigid and soft contact state at all times when the Vacuum interrupter P is closed. The other structures and effects are the same as the first embodiment described above, explanation thereof being omitted.

Seventh Modification Example

Figure 15:
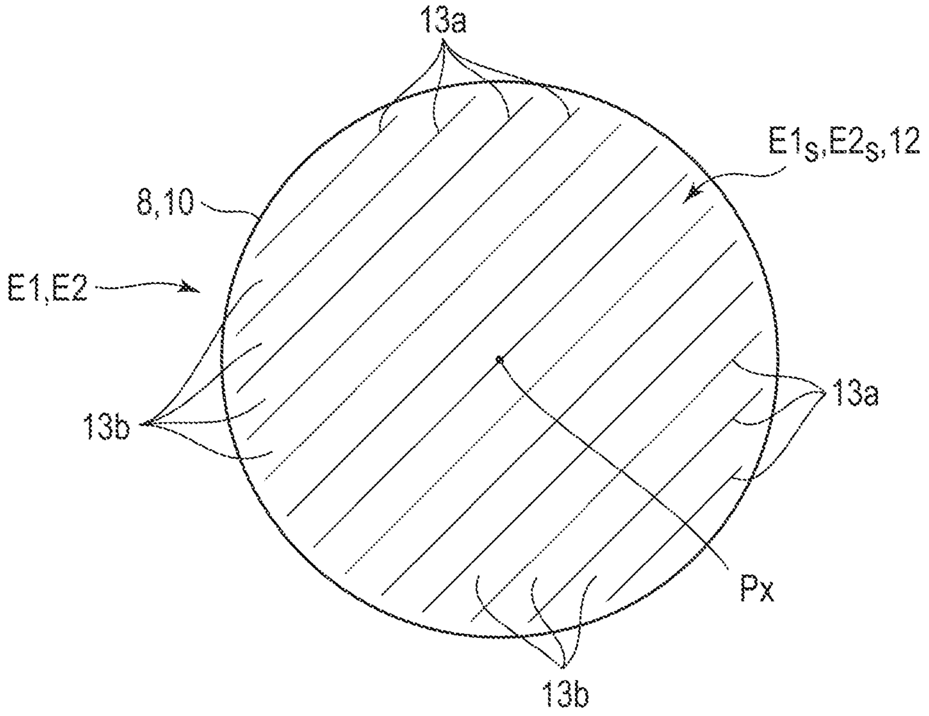
FIG. 15 is a plan view showing the structure of the opposed surfaces of the electrodes (contacts) according to a seventh modification example.

FIG. 15 is a planar structural diagram of the undulating structures 12 of the Vacuum interrupter P according to a seventh modification example. In the electrode opposed surfaces E1*s* and E2*s* comprising the undulating structures 12 of this example, a plurality of projections 13*a* linearly extend, and are provided parallel to each other at regular intervals. In this case, depressions 13*b* which are linearly continuous are provided so as to be adjacent to the projections 13*a*, respectively.

For example, in FIG. 15, in a manner similar to that of the above first embodiment, in each of the electrode opposed surfaces E1*s* and E2*s*, a plurality of projections 13*a* which have an outline projecting in a triangular shape and a plurality of depressions 13*b* which have an outline depressed in a triangular shape are provided.

In this structure, the projections 13*a* and the depressions 13*b* are alternately provided when they are viewed in a direction crossing the electrode opposed surfaces E1*s* and E2*s* (for example, a radial direction from the virtual axis Px).

According to the seventh modification example described above, in a manner similar to that of the above first embodiment, the contact state of the electrode opposed surfaces E1*s* and E2*s* is equivalent to a rigid and soft contact state at all times when the Vacuum interrupter P is closed. The other structures and effects are the same as the first embodiment described above, explanation thereof being omitted. Although not particularly shown in the figure, even if the projections 13*a* and depressions 13*b* which linearly extend are intermittently formed, similar effects can be obtained as a matter of course.

Eighth Modification Example

Figure 16:
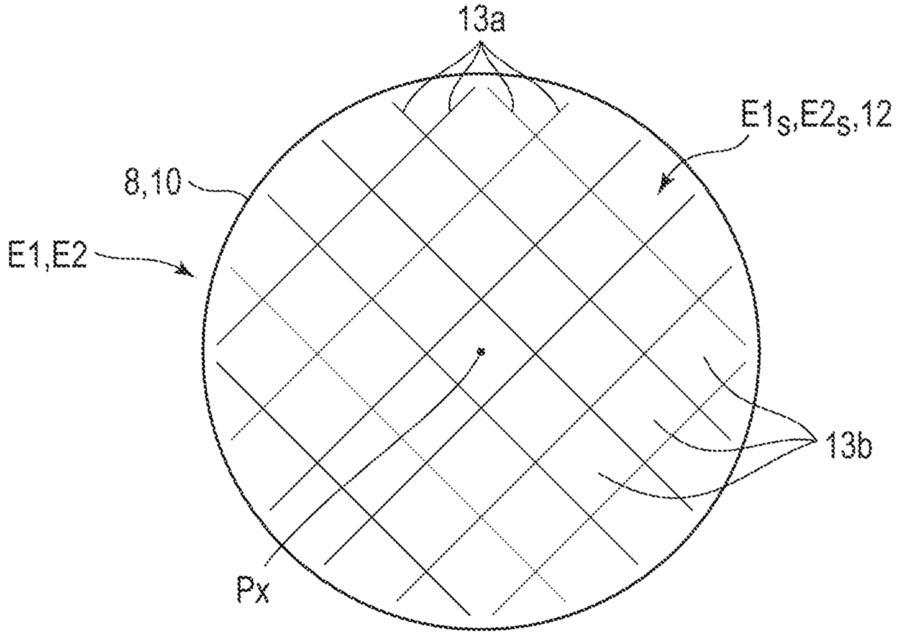
FIG. 16 is a plan view showing the structure of the opposed surfaces of the electrodes (contacts) according to an eighth modification example.

FIG. 16 is a planar structural diagram of the undulating structures 12 of the Vacuum interrupter P according to an eighth modification example. In the electrode opposed surfaces E1*s* and E2*s* comprising the undulating structures 12 of this example, a plurality of projections 13*a* linearly extend, and are provided at regular intervals such that they are parallel and orthogonal to each other. In this case, a rectangular depression 13*b* is provided in each of a plurality of areas surrounded by the projections 13*a*.

For example, in FIG. 16, in a manner similar to that of the above first embodiment, in each of the electrode opposed surfaces E1*s* and E2*s*, a plurality of projections 13*a* which have an outline projecting in a triangular shape and a plurality of depressions 13*b* which have an outline depressed in a triangular shape are provided.

In this structure, the projections 13*a* and the depressions 13*b* are alternately provided when they are viewed in a direction crossing the electrode opposed surfaces E1*s* and E2*s* (for example, a radial direction from the virtual axis Px).

According to the eighth modification example described above, in a manner similar to that of the above first embodiment, the contact state of the electrode opposed surfaces E1*s* and E2*s* is equivalent to a rigid and soft contact state at all times when the Vacuum interrupter P is closed. The other structures and effects are the same as the first embodiment described above, explanation thereof being omitted. Although not particularly shown in the figure, even if the projections 13*a* which linearly extend are intermittently formed, similar effects can be obtained as a matter of course.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A Vacuum interrupter comprising:

a pair of electrodes comprising electrode opposed surfaces, respectively, and provided such that the electrode opposed surfaces face each other, the electrodes being allowed to be separated from and connected to each other; and an undulating structure provided in each of the electrode opposed surfaces or in one of the electrode opposed surfaces, wherein the undulating structure comprises:

one or more projections which project from the electrode opposed surface such that the electrode opposed surface has a regular concavo-convex shape extending in a predetermined direction; and depressions provided so as to be adjacent to the projections, respectively, the projections and the depressions are alternately provided when viewed in a direction crossing the electrode opposed surface, and in a conducting state in which the electrodes are in contact with each other, the projections are in contact with the opposite electrode opposed surface, and the depressions are not in contact with the opposite electrode opposed surface.

2. The Vacuum interrupter of claim 1, wherein the projections are provided at regular intervals when viewed in the direction crossing the electrode opposed surface, and when a pitch width between two adjacent projections of the one or more projections is L, and a height of the projections defined by a difference in height between the projections and the depressions is H, a relationship of $L>H$ is satisfied.

3. The Vacuum interrupter of claim 2, wherein when arithmetic average roughness of surface roughness of the electrode opposed surfaces defined by JIS B 0601 is Ra, the height H of the projections satisfies a relationship of $H \approx 4 \times Ra$.

4. The Vacuum interrupter of claim 3, wherein the surface roughness of the electrode opposed surfaces caused to have the regular concavo-convex shape by the projections and the depressions is greater than or equal to 6.3 μm in the arithmetic average roughness Ra of the surface roughness measured with an evaluation length of 5 mm.

5. The Vacuum interrupter of claim 4, wherein the surface roughness of the electrode opposed surfaces caused to have the regular concavo-convex shape by the projections and the depressions is greater than or equal to 15 μm at a maximum height Rz of the surface roughness measured with an evaluation length of 5 mm.

6. The Vacuum interrupter of claim 4, wherein when the arithmetic average roughness Ra of the surface roughness of the electrode opposed surfaces measured with an evaluation length of 5 mm is greater than or equal to 6.3 μm, and a number of the provided projections is N in the direction crossing the electrode opposed surfaces, a mean value of the heights H of the N projections is greater than or equal to 30 μm.

7. The Vacuum interrupter of claim 1, wherein the undulating structure is provided in an entire part or part of the electrode opposed surface.

8. The Vacuum interrupter of claim 1, wherein in the undulating structure, the electrode opposed surface has a regular concavo-convex shape in which the projections and the depressions continuously extend in a predetermined direction.

9. The Vacuum interrupter of claim 8, wherein in the electrode opposed surface, the projections annularly extend, and are concentrically provided at regular intervals.

10. The Vacuum interrupter of claim 8, wherein in the electrode opposed surface, the projections linearly extend, and are provided parallel to each other at regular intervals.

11. The Vacuum interrupter of claim 8, wherein in the electrode opposed surface, the single projection helically extends.

12. The Vacuum interrupter of claim 1, wherein in the undulating structure, the electrode opposed surface has a regular concavo-convex shape in which the projections and the depressions intermittently extend in a predetermined direction.

13. The Vacuum interrupter of claim 12, wherein in the electrode opposed surface, the projections annularly extend, and are concentrically provided at regular intervals.

14. The Vacuum interrupter of claim 12, wherein in the electrode opposed surface, the projections linearly extend, and are provided parallel to each other at regular intervals.

15. The Vacuum interrupter of claim 12, wherein in the electrode opposed surface, the single projection helically extends.

16. The Vacuum interrupter of claim 1, wherein a shape of each of the projections includes at least triangular, rectangular, trapezoidal and arcuate outlines.

17. The Vacuum interrupter of claim 16, wherein in the undulating structure in which the projections have a rectangular outline, and in a direction crossing the electrode opposite surface, when a width of each of the projections is W1, and a width of each of the depressions is W2, a relationship of $W1 \geq W2$ is satisfied.

18. The Vacuum interrupter of claim 1, wherein each of the electrodes comprises a contact in which the electrode opposed surface is provided, and the contact is formed of a material consisting primarily of Ag and WC.

* * * * *